United States Patent
Chen

(10) Patent No.: US 10,877,744 B2
(45) Date of Patent: Dec. 29, 2020

(54) READ/WRITE METHOD AND READ/WRITE SYSTEM FOR FRU

(71) Applicants: INVENTEC (PUDONG) TECHNOLOGY CORPORATION, Shanghai (CN); INVENTEC CORPORATION, Taipei (TW)

(72) Inventor: Zhao Chen, Shanghai (CN)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 221 days.

(21) Appl. No.: 15/781,086

(22) PCT Filed: Mar. 2, 2016

(86) PCT No.: PCT/CN2016/075315
§ 371 (c)(1),
(2) Date: Jun. 1, 2018

(87) PCT Pub. No.: WO2017/092184
PCT Pub. Date: Jun. 8, 2017

(65) Prior Publication Data
US 2018/0357060 A1 Dec. 13, 2018

(30) Foreign Application Priority Data
Dec. 3, 2015 (CN) .......................... 2015 1 0880708

(51) Int. Cl.
*G06F 8/656* (2018.01)
*G06F 13/42* (2006.01)
(Continued)

(52) U.S. Cl.
CPC .......... *G06F 8/656* (2018.02); *G06F 13/4068* (2013.01); *G06F 13/42* (2013.01);
(Continued)

(58) Field of Classification Search
CPC ...... G06F 8/656; G06F 13/4068; G06F 13/42; G06F 13/4282; G06F 13/4291;
(Continued)

(56) References Cited

U.S. PATENT DOCUMENTS

| 6,973,517 B1 * | 12/2005 | Golden | G06F 15/16 710/104 |
| 7,603,585 B2 * | 10/2009 | Brinkmeyer | G06F 8/656 714/30 |

(Continued)

FOREIGN PATENT DOCUMENTS

| CN | 200941625 Y | 8/2007 |
| CN | 103092138 | 5/2013 |
| CN | 105027020 A | 11/2015 |

*Primary Examiner* — Aurel Prifti
(74) *Attorney, Agent, or Firm* — Maschoff Brennan

(57) ABSTRACT

A read/write method and a read/write system for a FRU are provided. The read method for the FRU comprises: a chassis management module identifying an embedded processor connected to the FRU according to an ID of the FRU inputted by a user; the chassis management module transferring the ID of the FRU and a command for reading and writing the FRU to the embedded processor connected to the FRU through a serial port; the embedded processor reading the FRU and sending a reading result to the chassis management module when identifying a type of the command as read. By the present invention, a user would complete a refresh for a FRU by inputting contents in form of a string into each field to be refreshed. Moreover, the duration of refreshing a single FRU is within 30 seconds and a fast refresh for a Node FRU is achieved.

4 Claims, 3 Drawing Sheets

(51) Int. Cl.
*G06F 15/163* (2006.01)
*G06F 13/40* (2006.01)

(52) U.S. Cl.
CPC ...... *G06F 13/4282* (2013.01); *G06F 13/4291* (2013.01); *G06F 15/163* (2013.01)

(58) Field of Classification Search
CPC ....... G06F 15/163; G06F 30/34; H04L 12/26; H04L 12/911
See application file for complete search history.

(56) References Cited

U.S. PATENT DOCUMENTS

| | | | | |
|---|---|---|---|---|
| 8,196,143 B2* | 6/2012 | Bavaria | ................. | G06F 9/4411 718/104 |
| 8,244,842 B1* | 8/2012 | Simons | ............... | G06F 11/3006 709/223 |
| 9,940,275 B2* | 4/2018 | Venkatasubba | ....... | G06F 13/362 |
| 10,007,634 B2* | 6/2018 | Dubal | ..................... | G06F 13/36 |
| 10,795,846 B1* | 10/2020 | Rathinasabapathi | ........................ | G06F 13/1668 |
| 2003/0172330 A1* | 9/2003 | Barron | ................. | G06F 11/1076 714/710 |
| 2003/0236998 A1* | 12/2003 | Gilstrap | ................ | G06F 21/445 726/34 |
| 2004/0162945 A1* | 8/2004 | King | .................. | G06F 11/0727 711/122 |
| 2004/0228063 A1* | 11/2004 | Hawkins | ............. | G06F 13/4291 361/115 |
| 2005/0002384 A1* | 1/2005 | Larson | ................ | G06F 13/4291 370/360 |
| 2006/0070058 A1* | 3/2006 | Menahemi | .............. | H04L 67/34 717/171 |
| 2006/0095629 A1* | 5/2006 | Gower | ................ | G06F 13/4243 710/305 |
| 2007/0089446 A1* | 4/2007 | Larson | ............... | G05D 23/1931 62/259.2 |
| 2011/0289268 A1* | 11/2011 | Patel | ................... | G06F 13/1689 711/105 |
| 2012/0023367 A1* | 1/2012 | Rudy | .................. | G06F 11/3055 714/16 |
| 2012/0185637 A1* | 7/2012 | Boecker | .................. | G06F 8/656 711/103 |
| 2013/0110926 A1* | 5/2013 | Yu | ...................... | H05K 7/20836 709/204 |
| 2014/0208139 A1* | 7/2014 | Hatamori | .................. | G06F 1/30 713/320 |
| 2014/0240909 A1* | 8/2014 | Stewart | ..................... | G06F 1/18 361/679.02 |
| 2015/0046761 A1* | 2/2015 | Messer | .................. | G06F 11/00 714/710 |
| 2015/0052596 A1* | 2/2015 | Ayanam | .................. | H04W 4/38 726/8 |
| 2015/0178095 A1* | 6/2015 | Balakrishnan | ........ | G06F 9/4411 710/110 |
| 2015/0262633 A1* | 9/2015 | Lee | ...................... | G11C 7/1075 710/308 |
| 2016/0098311 A1* | 4/2016 | Boecker | .............. | G06F 16/2425 714/37 |
| 2016/0246754 A1* | 8/2016 | Rao | .................. | G06F 13/4286 |
| 2017/0076892 A1* | 3/2017 | Black | .................. | G06F 13/4068 |
| 2019/0166032 A1* | 5/2019 | Inbaraj | .................... | H04L 43/16 |

* cited by examiner

READ/WRITE METHOD AND READ/WRITE SYSTEM FOR FRU

TECHNICAL FIELD

The present invention relates to a field of computer technology related to a r/w method, more particularly to a r/w method and a r/w system for a FRU.

BACKGROUND

In a standard server, read/write and refresh of a field replaceable unit (FRU) on a main board are implemented via a baseboard management controller (BMC). In a project of over the top (OTT, meaning that various services are provided to users via an internetwork) consisting of 24 ARM nodes and a chassis management module (CMM), there is a FRU on the CMM node and there are two FRUs on the rest 24 ARM nodes. There are 49 FRUs in total. In the 49 FRUs, except for the FRU on the CMM node which read/write can be implemented by the way of reading/writing the FRU on a standard server, there is no conventional way to implement read/write and refresh the 48 FRUs on the ARM nodes.

SUMMARY

Due to the shortcomings of the prior art, the purpose of the present invention is to provide a read/write method and a read/write system for a FRU so as to overcome the problem that read/write and refresh for FRUs on the node can not be implemented by a read/write method for a FRU in a standard server.

In order to achieve the above purpose and other relevant purposes, the present invention provides a read method for a FRU, which is adapted to a server. The read method for the FRU comprises: a chassis management module (CMM) identifies an embedded processor connected to the FRU according to an ID of the FRU inputted by a user; the chassis management module transfers the ID of the FRU and a command for reading and writing the FRU to the embedded processor connected to the FRU through a serial port; the embedded processor reads the FRU and sends a result of reading back to the chassis management module when identifying a type of the command as read.

Alternatively, the embedded processor reads the FRU via a I2C bus, and the embedded processor sends the result of reading back to the chassis management module via the serial port.

The present invention further provides a write method for a FRU, which is adapted to a server. The write method for the FRU comprises: a chassis management module (CMM) identifies an embedded processor connected to the FRU according to an ID of the FRU inputted by a user; the chassis management module transfers the ID and a command for reading and writing the FRU to the embedded processor connected to the FRU through a serial port; the embedded processor selects a FRU template to be stored in a cache according to an input of the user when identifying a type of the command as write; the embedded processor converts characters in form of a string in each FRU field, inputted by the user, into respective data of a number system and writes the respective data of the number system into a respective field of the FRU template in the cache; the embedded processor writes the FRU template rewritten in the cache into the FRU.

Alternatively, the write method for the FRU further comprises: the embedded processor reads data in the FRU from beginning so as to obtain read FRU data; the embedded processor determines whether the read FRU data matches data in the FRU template rewritten in the cache, a write for the FRU succeeds if matched and the write for the FRU fails if not matched; the embedded processor displays the FRU in form of the string after the write for the FRU succeeds.

Alternatively, the respective data of the number system comprises hexadecimal data.

Alternatively, the embedded processor writes the data in the FRU template rewritten in the cache into the FRU in 8-byte form, and the embedded processor reads the data in the FRU in 8-byte form from beginning.

Alternatively, the write method for the FRU further comprises: pre-store at least two FRU templates complying with FRU standard, a data field of each FRU template is initialized as zero, a control field of each FRU template, related to the data field, is initialized as a default value, total lengths of the FRU templates are different from one another.

The present invention further provides a read/write system for a FRU, which is adapted to a server. The read/write system for the FRU comprises: at least one ARM node, with two FRUs disposed on the ARM node; a chassis management module connected to the ARM node through an embedded processor and configured to control read/write of the FRU on the ARM node; the chassis management module communicatively connected to the embedded processor through a RS485 serial bus, and the embedded processor communicatively connected to the ARM node through an I2C bus.

Alternatively, the r/w system for the FRU further comprises: the chassis management module identifying an embedded processor connected to the FRU according to an ID of the FRU inputted by a user; the chassis management module transferring the ID and a command of reading and writing the FRU to the embedded processor connected to the FRU through a serial port; the embedded processor reading the FRU and sending a result of reading back to the chassis management module when identifying a type of the command as read.

Alternatively, the r/w system for the FRU further comprises: the chassis management module identifying an embedded processor connected to the FRU according to an ID of the FRU inputted by a user; the chassis management module transferring the ID and a command for reading and writing the FRU to the embedded processor connected to the FRU through a serial port; the embedded processor selecting a FRU template to be stored in a cache according to an input of the user when identifying a type of the command as write; the embedded processor converting characters in form of a string in each FRU field, inputted by the user, into respective data of a number system and writes the respective data of the number system into a respective field of the FRU template in the cache; the embedded processor writing the FRU template rewritten in the cache into the FRU; the embedded processor reading data in the FRU from beginning so as to obtain read FRU data; the embedded processor determining whether the read FRU data matches data in the FRU template rewritten in the cache, a write for the FRU succeeding if matched and the write for the FRU failing if not matched; the embedded processor displaying the FRU in form of character string after the write for the FRU succeeds.

Alternatively, the r/w system for the FRU further comprises: at least two FRU templates complying with FRU standard being pre-stored in the embedded processor, a data field of each FRU template being initialized as zero, a control field of each FRU template, related to the data field, being initialized as a default value, total lengths of the FRU templates being different from one another.

As described above, the r/w method and the r/w system for the FRU disclosed in the present invention have the following advantages: by using the present invention, a user is able to complete a refresh for a FRU conveniently by inputting contents in form of a string into each field to be refreshed. The duration of refreshing a single FRU is within 30 seconds and accordingly a fast refresh for a Node FRU is achieved.

SYMBOL DESCRIPTION

400 r/w system for FRU
410 Chassis Management Module
420 embedded processor
430 ARM node
S101~S103 step
S201~S210 step

DETAILED DESCRIPTIONS

The following is a description of embodiments of the present invention through specific examples, and those skilled in the art of the present invention can easily understand other advantages and effects of the present invention by the contents disclosed in the present specification. The present invention can also be implemented or applied through other different specific embodiments, and the details in this specification can also be applied based on different point of views. Various modifications or changes can be made without departing from the spirit of the present invention. It is noted that the technical features in the following embodiments and examples are allowed to be combined with each other as long as conflicts do not occur between them.

In addition, it is particularly noted that the drawings provided in the following embodiments merely illustrate the basic concept of the present invention in a schematic manner, so that the drawings only show the components related to the present invention and do not show the number of components, shapes and sizes in actual implementation. In fact, in an actual implementation, types, quantities and proportions of components can be modified arbitrarily, and the layout of the components may also be more complicated.

Figure 1:
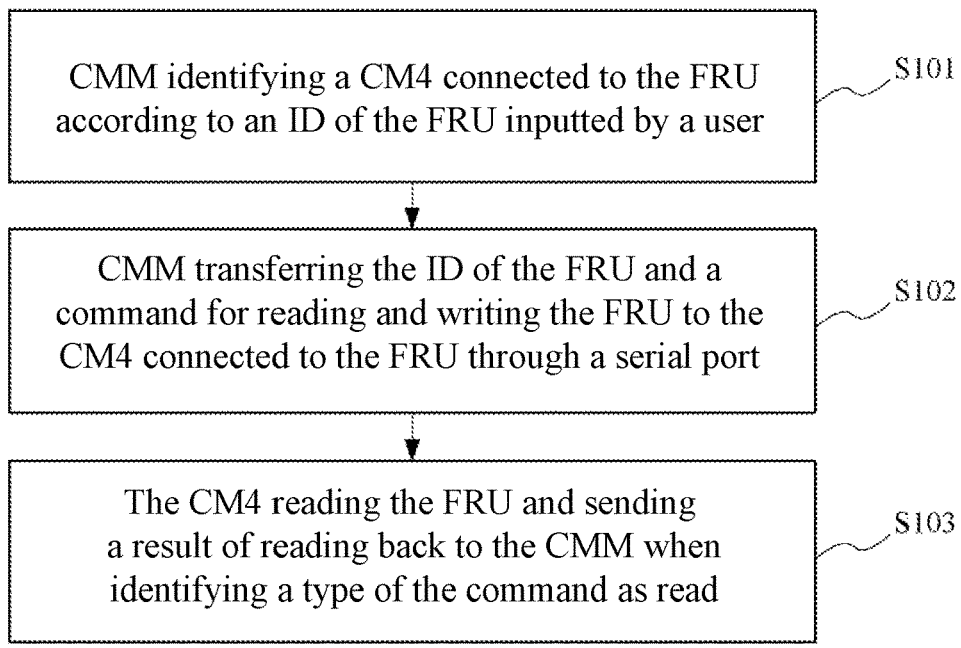
FIG. 1 is a flow chart of a read method for a FRU according to embodiments of the present invention.

Please refer to FIG. 1, which is a flow chart of a read method for a FRU according to embodiments of the present invention. As shown in the figure, a r/w method for a FRU is adapted to a server system, and the r/w method for the FRU includes the following steps:

Step S101 shows that a chassis management module (CMM) identifies an embedded processor connected to the FRU according to an ID of the FRU unputted by a user.

Step S102 shows that the chassis management module (CMM) sends the ID of the FRU and a command for reading and writing the FRU to the embedded processor connected to the FRU through a serial port. (an embedded processor Cortex-M4 developed by the CM4-ARM company, CM4)

Step S103 shows that the embedded processor reads the FRU when identifying a type of the command as read, and sends a result of reading back to the chassis management module. Wherein, the embedded processor reads the FRU via an I2C bus. The embedded processor sends the result of reading back to the chassis management module via the serial port. The embedded processor reads the data in the FRU in 8-bytes form from beginning.

The scope of the r/w method for the FRU disclosed in the present invention is not limited to the order of steps implementation as indicated in the embodiment. Any solution implemented by changing or replacing the steps based on the principle of the present invention are within the scope of the present invention.

Figure 2:
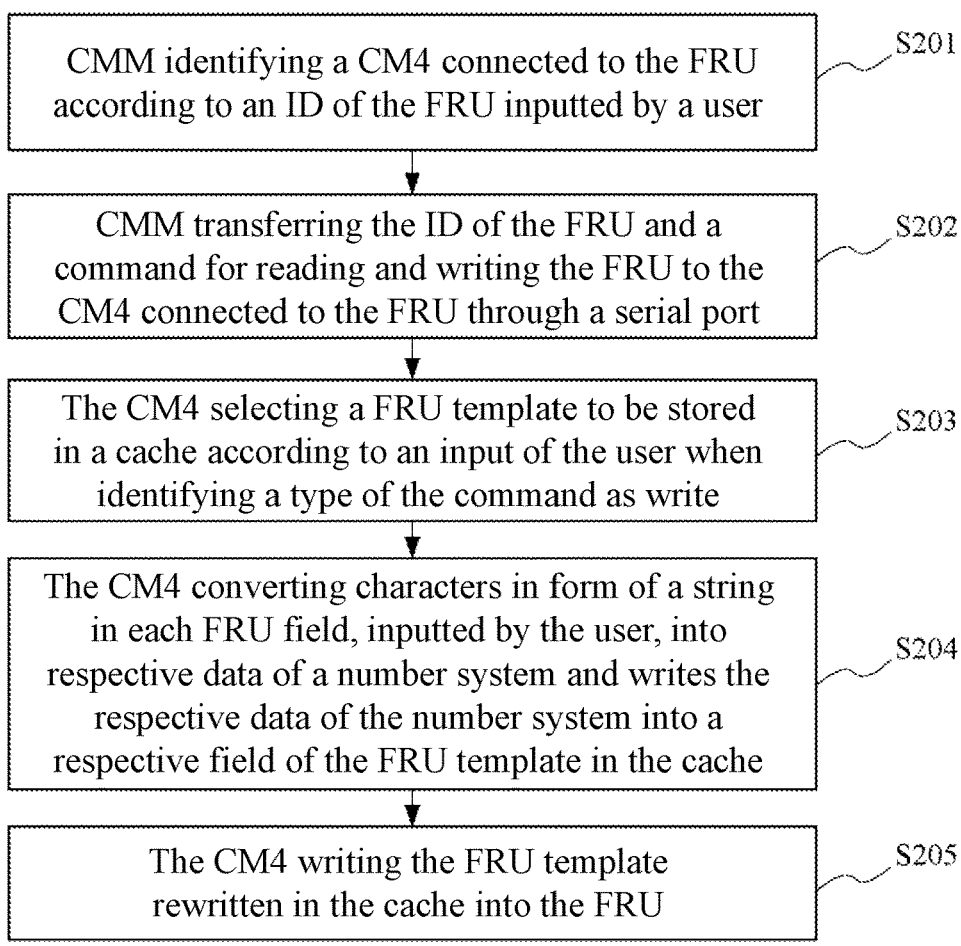
FIG. 2 is a flow chart of a write method for a FRU according to one embodiment of the present invention.

Please refer to FIG. 2, which is a flow chart of a write method for a FRU according to one embodiment of the present invention. As shown in the figure, a write method for a FRU adapted to a server system is further provided in embodiments of the present invention. The write method for the FRU includes the following steps:

Step S201 shows that the chassis management module (CMM) identifies an embedded processor connected to the FRU according to an ID of the FRU inputted by a user.

Step S202 shows that the chassis management module (CMM) sends the ID of the FRU and a command for reading and writing the FRU to the embedded processor connected to the FRU through a serial port. (an embedded processor Cortex-M4 developed by the CM4-ARM company, CM4)

Step S203 shows that the embedded processor selects a specific FRU template to be stored in a cache according to an input of a user when identifying a type of the command as write. Wherein, the embedded processor is capable of pre-storing at least two FRU templates complying with FRU standards; data fields of each FRU template are all initialized to be 0; control fields of each FRU template, related to the data fields, are all initialized as default values; total lengths of the FRU templates are different from one another, and lengths of the same data fields of the FRU templates are different from one another or are all the same.

Step S204 shows that the embedded processor converts characters in form of a string in each FRU field, inputted by a user, into respective data of a number system, and further writes the respective data of the number system into a respective field of the FRU template stored in the cache. The respective data of the number system includes hexadecimal data.

Step S205 shows that the embedded processor writes the rewritten FRU template in the cache into the FRU. The embedded processor may write the rewritten FRU template in the cache into the FRU in 8-byte form.

Figure 3:
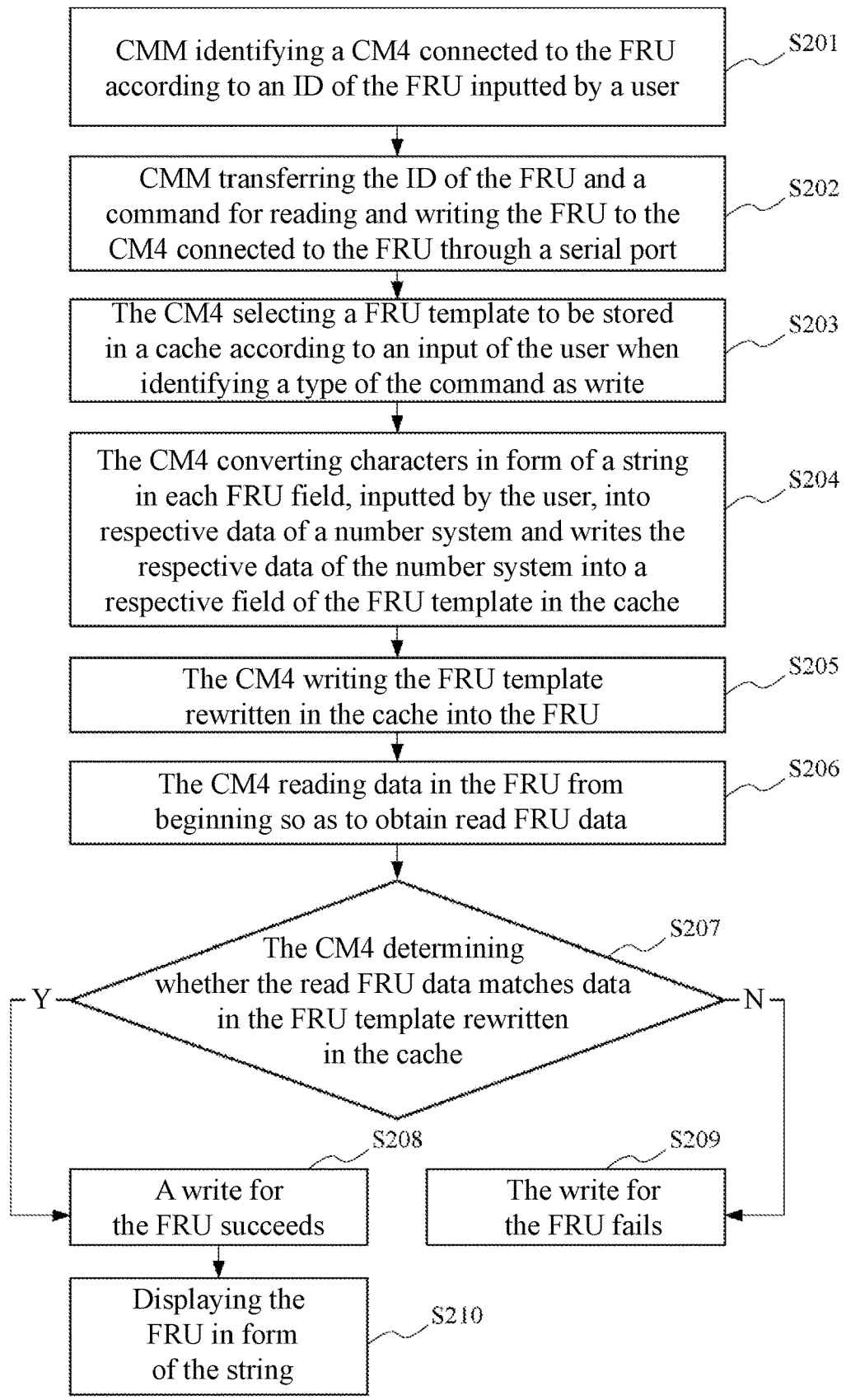
FIG. 3 is another flow chart of the write method for FRU according to one embodiment of the present invention.

Please continue to refer to FIG. 3, which is another flow chart of the write method for FRU according to one embodiment of the present invention. As shown in the figure, the write method further includes the following steps:

Step S206 shows that the embedded processor reads the data in the FRU from the beginning and obtains the read data of the FRU.

Step S207 shows that the embedded processor determines whether the read data of the FRU matches the data of the rewritten FRU template in the cache.

Step S208 shows that the write of the FRU succeeds if matched;

Step S209 shows that the write of the FRU fails if not matched;

Step S210 shows that the embedded processor displays the FRU in form of the string after the write of the FRU succeeds.

In a standard server, r/w of a FRU on a main board complies with standards of Intelligent Platform Management Interface (IPMI). Device_id (ID) servers as a precondition of the r/w of FRU, namely to determine whether the FRU exists or not. The Device_id is generally admitted to be 0, and then functions of r/w of the FRU are adjusted and a result is sent back based on offset of r/w and the number of bytes to be read or the number of bytes to be written. In the project of Over The Top (OTT, meaning that various services are provided to users via an internetwork), there are 49 FRUs in total. Since the r/w method of the FRU on the Chassis Management Module (CMM) Node is identical to the r/w method of the FRU on a main board of a standard server, the Device_id can be set to be 0. The rest 48 FRUs have Device_ids in a range of 1-48 according to the locations of ARM nodes in the OTT chassis.

In the project of OTT, when a FRU Device_ids inputted by a user are within the range of 1-48, a CMM identifies a CM4 connected to the FRU according to the Device_id, and further sends the device_id and a command related to r/w of the FRU to the respective CM4 through a serial port. When the CM4 receives the command sent by the CMM via the serial port, first of all, the CM4 identifies a type of the command. When the command is identified as r/w for the FRU of the ARM Node, the CM4 implements reads and writes for the respective FRU. Finally, the CM4 sends a result of r/w to the CMM via the serial port. Although the r/w for the FRU of the ARM Node can be implemented by the CMM in the above method, the user has to write data in hexadecimal form corresponding to specific characters into the FRU. Since when the FRU of the ARM Node is refreshed, it is required to write 512 bytes based on the standard of FRU. It is possible to cause troubles and errors if the 512 Hexadecimal data is inputted manually. Thereby, a new and convenient method of refreshing the FRU of the ARM Node is provided in the present invention.

First of all, several templates complying with FRU standard is reserved in the present invention. In each template, fields corresponding to FRU data (namely "data fields") are all initialized to be 0, and the rest control fields related to the data fields of the FRU (e.g. a length of each data field) are all set as default values. The difference between the templates lies in that the lengths of the templates are different from one another. For example, the length may be 256 bytes or 512 bytes; lengths of the same data fields of the FRU templates may be different. A user may select a different FRU template according to demands when the FRU is refreshed.

Secondly, when a refresh of the FRU is requested, the user only needs to input corresponding characters into each field of the FRU.

Finally, in an operation of a program executed by a user (namely the write method for the FRU in the present invention), the program finds a template set by the user first and then converts the characters, inputted in a field by the user, into hexadecimal data. Further, the program rewrites the hexadecimal data into a respective field of the template selected by the user. The above steps are repeated until the rewritten for each of field where the user inputs is completed. The program starts adjusting the write command for the ARM Node FRU after completing the rewritten for each of field where the user inputs. The program keeps writing 8 bytes into the FRU designated by the user each time from the head of the selected template until all data in the template are written. When the writes for the data in the FRU template are completed, the program further reads data which is written in the respective FRU. The program reads 8 data back in each time and compares the read 8 data to another 8 data in the same position of the written template. The above steps are repeated until the reads for the all written data is completed. When it is confirmed that the written data is correct, the whole FRU is read and the contents written into each field are displayed in form of a string. Accordingly, the refresh of the ARM Node FRU is completed.

By using the present invention, a user is able to input contents in form of a string into each field of the FRU to be refreshed so as to easily complete the refresh for the FRU. Moreover, the duration of refreshing a single FRU is within 30 seconds and accordingly a fast refresh for a Node FRU is achieved.

The scope of the write method for the FRU in the present invention is not limited to the order of implementing the steps disclosed in the embodiment. Any solution implemented by changes and replacements made to the steps of the prior art based on the principle of the present invention are within the scope of the present invention.

The present invention further provides a r/w system for a FRU, which implements the r/w method for the FRU. However, the device for implementing the r/w method for the FRU includes but not limited to the structure of the r/w system for the FRU given in the embodiment. Various modifications and replacements made on the conventional structure according to the principle of the present invention are within the scope of the present invention.

Figure 4:
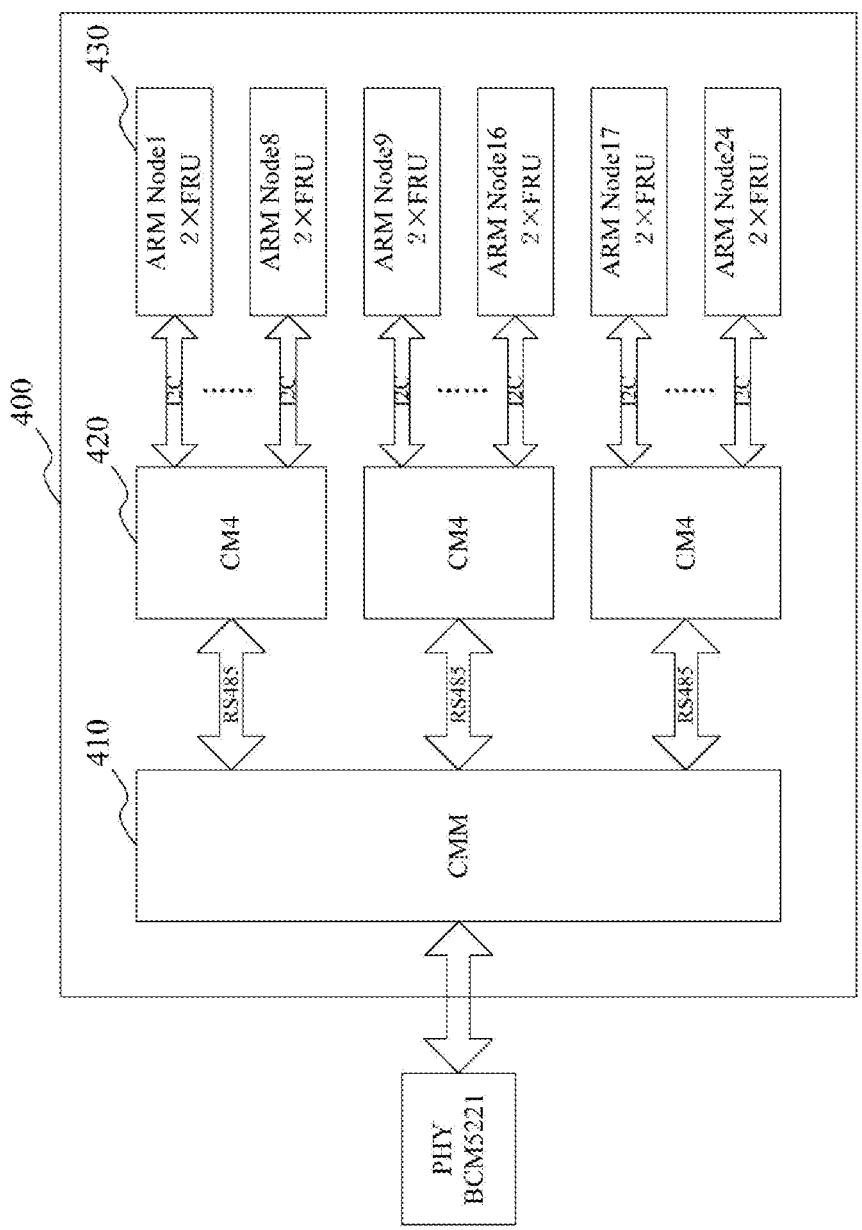
FIG. 4 is a structure diagram of a r/w system for a FRU according to one embodiment of the present invention.

Please refer to FIG. 4, a r/w system 400 for a FRU is adapted to a server system. The r/w system 400 for the FRU includes: a Chassis Management Module (CMM) 410, an embedded processor (an embedded processor Cortex-M4 developed by the CM4-ARM company, CM4) 420, and at least one ARM node 430. Wherein, two FRUs are disposed on each ARM; the Chassis Management Module 410 is connected to the ARM node 430 through the embedded processor 420 and controls reads and writes for the FRUs on each ARM node. Further, the Chassis Management Module 410 is communicatively connected to the embedded processor 420 through a RS485 serial bus, and the embedded processor 420 is communicatively connected to the ARM node 430 through an I2C bus.

Wherein, the process of the r/w system for reading the FRU includes:

The Chassis Management Module 410 identifies an embedded processor connected to the FRU according to an ID of the FRU inputted by a user, and further sends the ID of the FRU and a command related to reads and writes for FRU to the embedded processor connected to the FRU through a serial port.

The embedded processor 420 reads the FRU and sends a result of reading back to the chassis management module when identifying a type of the command as read. The embedded processor may read data in the FRU from the beginning in 8-byte form.

Wherein, the process of the r/w system for writing the FRU includes:

The Chassis Management Module 410 identifies an embedded processor connected to the FRU according to an ID of the FRU inputted by a user, and further sends the ID of the FRU and a command for reading and writing for the FRU to the embedded processor connected to the FRU through a serial port.

The embedded processor selects a specific FRU template to be stored in a cache according to an input of a user and when identifying a type of the command as read. The embedded processor further converts characters in form of a string in each FRU field, inputted by the user, to respective data of a number system and writes the respective data of the number system into a respective field of the FRU template in the cache. Wherein, the embedded processor 420 is capable of pre-storing at least two FRU templates complying with FRU standards; data fields of each FRU template are all initialized to be 0; control fields of each FRU template, related to the data fields, are all initialized as default values; total lengths of the FRU templates are different from one another. The respective data of the number system includes hexadecimal data.

The embedded processor writes the written FRU template in the cache into the FRU; the embedded processor reads the data in the FRU from the beginning and obtains the read data of the FRU. The embedded processor further determines whether the read data in the FRU matches the data in the written FRU template in the cache; if it matches, the write for the FRU succeeds; if it does not match, the write for the FRU fails; the embedded processor displays the FRU in form of a string after the write for the FRU succeeds. The embedded processor may write the rewritten FRU template in the cache into the FRU in 8-byte form.

In the items of OTT, the 48 FRUs on the 24 ARM Nodes are connected to 3 CM4s via I2C buses respectively. The 3 CM4 are connected to the CMM via RS485 serial buses. The CM4s are not capable of communicating with outside world because the CM4s do not have internet modules. The CMM has internet modules and the capability of communicating with outside world based on IPMI protocol. Therefore, the implementation of controlling the CM4 for performing the reads and the writes by the CMM and refreshing the 48 FRUs can be achieved in the r/w method and the r/w system for the FRU disclosed in the present invention.

Based on the above descriptions, the present invention overcomes various shortcomings of the prior art and has high values of industrial use.

The descriptions of preferable embodiments are provided to clearly describe the features and the spirit of the present invention. The preferable embodiments do not limit the scope of the present invention. On the contrast, as a purpose of the present invention, it is intended that the scope of the present invention covers various modifications and equivalent arranges.

The invention claimed is:

1. A read and write system for a field replaceable unit (FRU), which is adapted to a server, with the read and write system for the FRU comprising:
   at least one advanced reduced instruction set computer (RISC) machine (ARM) node, with two FRUs disposed on the ARM node; and
   a chassis management module communicatively connected to the ARM node through an embedded processor and configured to control read and write of the FRU on the ARM node, the chassis management module communicatively connected to the embedded processor through a RS485 serial bus, and the embedded processor communicatively connected to the ARM node through an inter-integrated circuit (I2C) bus,
   the chassis management module (CMM) identifying the embedded processor connected to the FRU according to an identity document (ID) of the FRU inputted by a user and transferring the ID and a command for reading and writing the FRU to the embedded processor connected to the FRU through a serial port;
   the embedded processor selecting a FRU template to be stored in a cache according to an input of the user when identifying a type of the command as write and the embedded processor converting characters in form of a string in each FRU field, inputted by the user, into respective data of a number system and writes the respective data of the number system into a respective field of the FRU template in the cache; the embedded processor writing the FRU template rewritten in the cache into the FRU;
   the embedded processor reading data in the FRU from beginning so as to obtain read FRU data and determining whether the read FRU data matches data in the FRU template rewritten in the cache, a write for the FRU succeeding if matched and the write for the FRU failing if not matched; and
   the embedded processor displaying the FRU in form of character string after the write for the FRU succeeds.

2. The read and write system for the FRU according to claim 1, wherein the read and write system for the FRU further comprises:
   the chassis management module identifying the embedded processor connected to the FRU according to the ID of the FRU inputted by the user;
   the chassis management module transferring the ID and the command of reading and writing the FRU to the embedded processor connected to the FRU through the serial port; and
   the embedded processor reading the FRU and sending a result of reading back to the chassis management module when identifying the type of the command as read.

3. A read and write system for a field replaceable unit (FRU), which is adapted to a server, with the read and write system for the FRU comprising:
   at least one advanced reduced instruction set computer (RISC) machine (ARM) node, with two FRUs disposed on the ARM node; and
   a chassis management module communicatively connected to the ARM node through an embedded processor and configured to control read and write of the FRU on the ARM node, the chassis management module communicatively connected to the embedded processor through a RS485 serial bus, and the embedded processor communicatively connected to the ARM node through an inter-integrated circuit (I2C) bus,
   wherein the read and write system for the FRU further comprises:
   at least two FRU templates complying with FRU standard being pre-stored in the embedded processor, a data field of each FRU template being initialized as zero, a control field of each FRU template, related to the data field, being initialized as a default value, total lengths of the FRU templates being different from one another, and lengths of the same data fields of the FRU templates being different from one another.

4. The read and write system for the FRU according to claim 3, wherein the read and write system for the FRU further comprises:
   the chassis management module identifying the embedded processor connected to the FRU according to an identity document (ID) of the FRU inputted by a user;
   the chassis management module transferring the ID and a command of reading and writing the FRU to the embedded processor connected to the FRU through a serial port; and the embedded processor reading the FRU and sending a result of reading back to the chassis management module when identifying a type of the command as read.

* * * * *